May 28, 1963  L. J. HOFFMAN  3,091,214
MULTICOLOR INSTRUMENT
Filed July 18, 1961  2 Sheets-Sheet 1
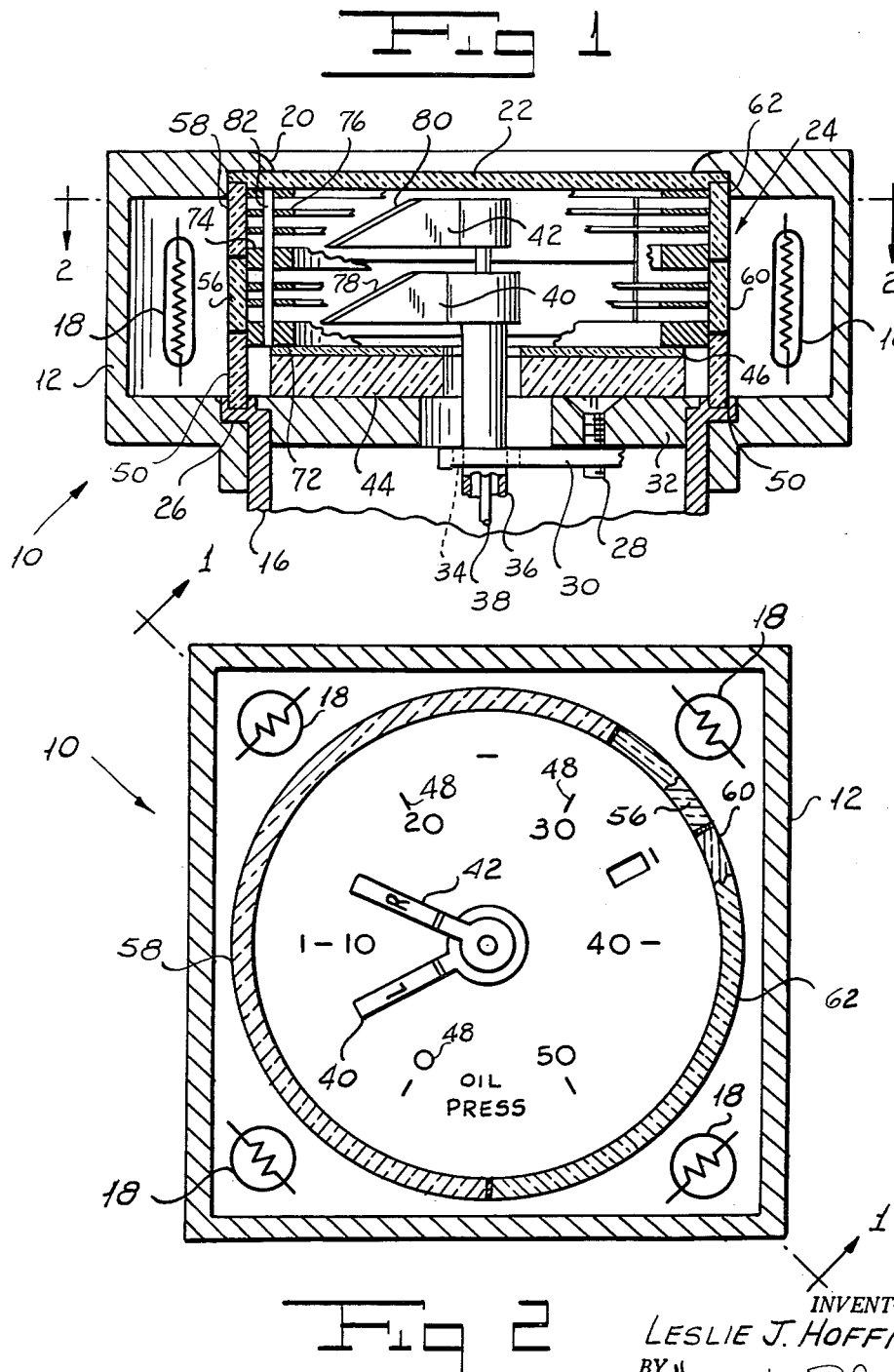
INVENTOR.
LESLIE J. HOFFMAN
BY
ATTORNEY

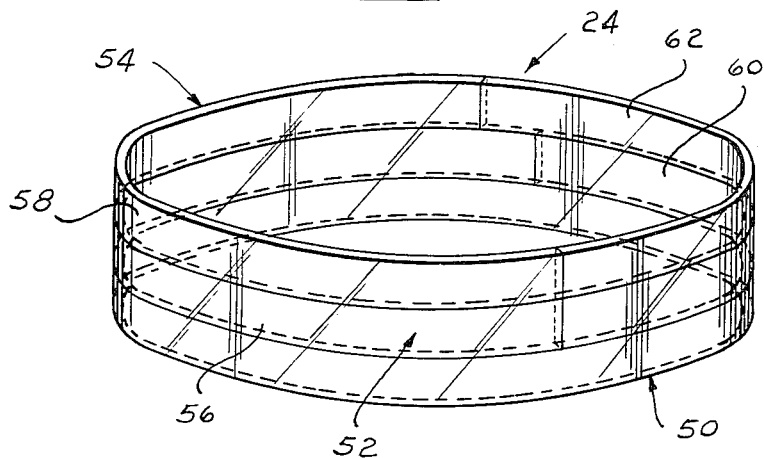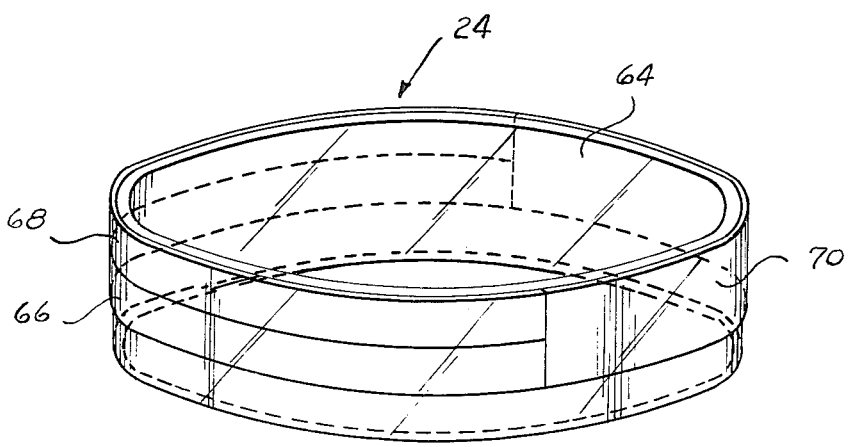

United States Patent Office 3,091,214
Patented May 28, 1963

3,091,214
MULTICOLOR INSTRUMENT
Leslie J. Hoffman, Orange, Conn., assignor to United Aircraft Corporation, East Hartford, Conn., a corporation of Delaware
Filed July 18, 1961, Ser. No. 124,977
10 Claims. (Cl. 116—129)

My invention relates to a multicolor instrument and more particularly to an improved instrument which is more easily read than are instruments of the prior art.

My copending application, Serial No. 37,906 filed June 26, 1960, discloses an instrument illumination system which is especially adapted for use in illuminating the instruments on an aircraft instrument panel or the like. In the system, light from a suitable source passes through a skirt ring and edge-lights a dial block the face of which is etched or otherwise treated to provide suitable dial markings. Light from the skirt ring also floods into the space in front of the dial to illuminate the dial pointer. The instrument disclosed in my copending application is provided with a plurality of light louvers disposed in spaced relationship between the instrument face glass and the dial face to prevent light from the skirt ring from directly reaching the normal viewing position of the observer's eye.

In modern aircraft the number of instruments required to be provided on the pilots instrument panel is so great that it has been suggested that a plurality of superimposed pointers be associated with a single dial face provided with one or more sets of dial markings. While such instruments contribute to the solution of the problem of reducing the number of dials, they create another problem of distinguishing between the various pointers associated with a single dial face.

In the prior art it has been the practice to provide the dial face with a color strip or arc line at or near the dial face to indicate areas of critical or dangerous operation. While this system operates satisfactorily under daytime conditions, where the instruments are artificially illuminated, identification of these areas becomes extremely difficult and the significance of the areas may be entirely lost.

In some instruments of the prior art, it has been suggested that means be provided to cause a pointer to be illuminated with different color light as it enters areas of dangerous or critical operation. In one system of the prior art for accomplishing this result, reflected light is passed through a filter and then directed onto a pointer of triangular cross section. While such an arrangement is satisfactory for relatively non-critical applications, in other instances it is not satisfactory since there is no sharp line of color change as the pointer moves from one area to another.

I have invented a multicolor instrument which overcomes the defects of systems of the prior art employing a number of superimposed pointers which cooperate with a single dial face. I arrange my instrument so that a clear distinction is made between the points of a plurality of pointers associated with a single dial face. My instrument readily lends itself to a definition of an area or areas of critical or dangerous operation. These areas may be the same or they may be different for a pair of superposed pointers which cooperate with a single dial face. My instrument provides a clear line of demarcation between respective areas or segments on the dial face. I provide my instrument with means for preventing interference between light of different colors adapted to illuminate different pointers which cooperate with the same dial face.

One object of my invention is to provide a multicolor instrument which affords a clear distinction between the pointers of a plurality of pointers associated with a single dial face.

Another object of my invention is to provide a multicolor instrument which readily lends itself to the definition of various segments of pointer movement with relationship to the dial face.

A further object of my invention is to provide a multicolor instrument in which a clear line of demarcation is provided between adjacent areas of pointer movement with reference to the dial face.

A still further object of my invention is to provide a multicolor instrument in which interference between different color lights associated with respective pointers is prevented.

Other and further objects of my invention will appear from the following description.

In general my invention contemplates the provision of a multicolor instrument in which superimposed, chisel-shaped pointers cooperating with a scale or scales on the dial face are illuminated respectively with light of different colors. Louvers associated with the instrument skirt ring prevent interference between the light which illuminates the respective pointers. I make provision for changing the color of one or both of the pointers in certain sectors of movement of the pointers with respect to the dial.

In the accompanying drawings which form part of the instant specification and which are to be read in conjunction therewith and in which like reference numerals are used to indicate like parts in the various views:

FIGURE 1 is a sectional view of my multicolor instrument with parts broken away taken along the line 1—1 of FIGURE 2.

FIGURE 2 is a sectional view of my multcolor instrument taken along the line 2—2 of FIGURE 1.

FIGURE 3 is a perspective view on an enlarged scale of one form of skirt ring which I may employ in my multicolor instrument.

FIGURE 4 is a perspective view on an enlarged scale of an alternate form of skirt ring which I may employ in my multicolor instrument.

Referring now to the drawings, by multicolor instrument, indicated generally by the reference character 10, includes a light housing 12 which may, for example, be generally rectangular in shape. I secure the housing 12 to the instrument case 16 by any suitable means such as by cement or the like. Housing 12 carries a plurality of sources 18 of illumination which may be of the type shown in my co-pending application referred to hereinabove and adapted to be readily removed from the housing 12. Housing 12 is formed with a bezel 20 which receives the face glass 22 of the instrument to which I secure the skirt ring assembly, indicated generally by the reference character 24, to be described hereinafter. Skirt ring 24 is also supported in the instrument case 16 by a groove formed in a peripheral flange 26 in the end of housing 16. Any suitable means such, for example, as a screw 28 or the like secures a bearing bracket 30 to a support plate 32 carried by the case 16. Bracket 30 carries a bearing 34 which rotatably supports a hollow pointer shaft 36 within which I dispose a second pointer shaft 38. I mount respective instrument pointers 40 and 42 on shafts 36 and 38 for rotation therewith. As is known in the art in response to a change in the condition to which the instrument associated with one of the pointers 40 and 42 is responsive, the corresponding shafts 36 and 38 are displaced.

Support plate 32 carries a dial block 44 formed of a suitable transparent material such as glass or the like.

The surface of block 44 carries a film 46 which is etched or otherwise provided with suitable marks or indicia 48 through which light from the block 44 passes. From the structure thus far described, it will be seen that pointers 40 and 42 cooperate with the markings 48 to afford indications of particular conditions. In a particular example, the marks 48 can be used to indicate oil pressure with the respective pointers 40 and 42 being associated with port and starboard engines of an aircraft. While in such a form of the instrument only a single scale is provided by the marks 48 for cooperation with the pointers, it will readily be appreciated that I could if desired, provide pointers of different length and could form concentric scales for cooperation with the pointers.

In the form of my invention illustrated in FIGURE 3 of the drawings, the skirt ring assembly 24 includes a first portion 50 which surrounds the dial block 44. Light from the sources 18 floods through the section 50 around the edge of the block 44 thus to illuminate the block to make the marks 48 visible by means of light passing through the marks. The skirt ring portion 50 can be made to transmit light of any desired color to the edge of the block 44. This can be accomplished either by using colored glass or by coating the glass with any suitable dye such, for example, as an epoxy dye. Let us assume by way of example that the innermost portion 50 of the skirt ring is clear so that it transmits white light from the source 18 to the dial block 44.

In the form of my invention shown in FIGURE 3, I superimpose two other ring portions, indicated generally by respective reference characters 52 and 54, on top of the portion 50. The ring portion 52 is associated with the pointer 40 while the ring portion 54 is associated with the pointer 42. I form one segment 56 of the ring 52 from a suitable colored glass which causes the pointer 40, for example, to be illuminated with a particular color such as green over most of the extent of its movement with reference to the dial face 46. This can be accomplished by using colored glass or the surface of the glass can be coated with a suitable dye. I form a segment 58 of the ring 54 to transmit light of a color which contrasts with the color transmitted by the segment 56 of ring 52. For example, I may form the segment 58 from glass which transmits yellow light. Alternately to using colored glass, I may coat the ring segment with a yellow dye.

As is known in the art the dial faces of instruments customarily are provided with lines or marks which indicate an area of dangerous operating conditions. While such marks may be satisfactory under daylight conditions, they do not successfully accomplish their intended result under darkened conditions. In my instrument I define critical areas of dangerous conditions by changing the color of the light illuminating the pointer. Where the two pointers 40 and 42 indicate the same conditions for port and starboard engines, for examples, I change the color at the same relative position of each of the pointers. As is pointed out hereinabove, my instrument may be used to indicate two different conditions, the critical areas of which do not begin at corresponding points on the dial 46. In this use of my instrument, I form the respective rings 52 and 54 with segments 60 and 62 of a different extent. Each of the segments 60 and 62 may transmit a color which alerts the observer to the fact that a critical area of operation is being entered upon. For example, these two segments may be formed from red glass or alternatively they may be coated with an epoxy dye which causes the segments to transmit only red light. I employed any appropriate means such, for example, as a suitable cement for securing the segments and rings of the skirt ring assembly 24 together.

Referring now to FIGURE 4, I have shown an alternate form of skirt ring assembly 24 which may be used to produce the desired color effects outlined above. In this form of my invention I provide a clear glass skirt ring 64 which surrounds both the dial block 44 and the pointers 40 and 42. In order to achieve a color distinction between the two pointers 40 and 42 over the major portion of their movement relative to the dial face 46, I apply respective plastic strips 66 and 68 to the ring 64. Strips 66 and 68 transmit the appropriate colors which permit ready distinction between the pointers 40 and 42 over a major portion of their movement with respect to the dial face 46. Assuming that both pointers 40 and 42 enter an area on the dial face corresponding to a critical operating area at the same point, I apply a plastic strip 70 to the ring 64 in the remaining area to cause the light flooding onto the pointers 40 and 42 to change color when the pointers are adjacent this strip.

Referring again to FIGURES 1 and 2, my instrument includes a louver assembly made up of a first louver 72 disposed immediately adjacent the dial face 46 and a separating louver 74 which separates the areas of illumination of the respective pointers 40 and 42. I place additional louvers 76 in spaced relationship between the louvers 72 and 74 and between face glass 22 and louver 74 to prevent stray light from the skirt ring assembly from reaching the eye of the observer. These louvers serve to break up light from the source 18 passing through the skirt ring assembly 24 into separate planes of illumination and thus prevent any interference between the light which illuminates the pointer 40 and that which illuminates the pointer 42 as well as preventing interference between the dial block illuminating light and that which illuminates the pointers.

An important feature of my invention is that I form each pointer 40 and 42 with a chisel-shape providing a respective light receiving faces 78 or 80. Owing to this shape, the pointer is illuminated only by light from a radial direction which is aligned with the longitudinal axis of the pointer. This construction permits a clear and distinct line of demarcation between areas of different color as the pointer moves with respect to the dial. This arrangement affords a clear advantage over arrangements of the prior art in which triangular pointers receive light from all directions so that no clear change in color of the pointer is manifest as it moves from a region of one color to an adjacent region of another color.

It will be readily apparent that the thickness and spacing of the various louvers determines their operation in defining the various planes of illumination of my instrument. I employ any suitable means such, for example, as pins 82 to which the louvers are cemented for holding them in spaced relationship to each other in an assembled condition.

In operation of my multicolor instrument with the pointers 40 and 42 in their normal operating region, the dial face 44 is illuminated by light passing through the lower skirt ring portion 50 and into the dial block 44 through the edge thereof. The respective pointers 40 and 42 are illuminated by light of a different color passing through the respective skirt ring segments 56 and 58 and onto the surfaces 78 and 80 of the pointers. When the pointer 42, for example, enters an area of critical operation the pointer is adjacent the segment 62 and the light which impinges on its surface 80 is of such a color as to alert the observer to the fact that a dangerous or critical condition of operation is being indicated. The operation of the pointer 40 when it enters a region of critical operation is substantially the same. I achieve my color differences and color changes by using colored glass to make up the skirt ring segments and portions or I apply colored plastic strips to an integral skirt ring of a clear material.

It will be seen that I have accomplished the objects of my invention. It have provided a multicolor instrument in which a plurality of superimposed pointers are illuminated with different respective colors without the danger of interference between the light illuminating the respective pointers. I provide my instrument with means for clearly and distinctively changing the color of a pointer as it moves from one area of operation to another. I accomplish these desirable results without the danger of stray light reaching the observer's eye.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a multicolor instrument a pair of pointers, a dial face carrying indicia, means mounting said pointers for movement relative to said indicia to cooperate with said indicia, means for illuminating the respective pointers with light of different colors and means for positioning said pointer illuminating means relative to said pointer to cause said illuminating means to illuminate the respective pointers with light of different colors.

2. In a multicolor instrument a pair of pointers, a dial face carrying indicia, means mounting said pointers for movement over said dial face, means for illuminating said pointers with light of different colors over certain areas of their movement with reference to the dial face, means for illuminating said pointers with light of the same color over another area of their movement with reference to the dial face and means for positioning the respective illuminating means with relation to said pointers to cause the first named illuminating means to illuminate said pointers with light of different colors over said certain areas and to cause said second named illuminating means to illuminate said pointers with light of the same color over said other area.

3. In a multicolor instrument, a pair of pointers, a dial face carrying indicia with which said pointers cooperate, means mounting said pointers for movement about a common axis across said dial face, means for illuminating said pointers with light of different colors and means for positioning said illuminating means with relation to said pointers to cause the illuminating means to illuminate the respective pointers with light of different colors, 4. In a multicolor instrument, a pair of pointers, a dial face carrying indicia with which said pointers cooperate, means mounting said pointers for movement across said dial face, a member formed of light permeable material having areas of different colors, means mounting said member adjacent the edge of said dial face and a source of illumination disposed on the side of said member remote from the dial face, said member being constructed to pass light of one color from the source to one of said pointers and being adapted to pass light of a different color from the source to the other pointer.

5. In an instrument illumination system a pair of pointers, a dial carrying indicia with which said pointers cooperate, means mounting said pointers for movement across said dial face, a light permeable skirt ring having areas of different colors surrounding said dial and a source of illumination disposed outside said skirt ring, said source being adapted to supply light through said skirt ring onto said pointers, said skirt ring being adapted to pass light of one color to one of said pointers and being adapted to pass light of another color to the other of said pointers.

6. In an instrument illumination system a pair of pointers, a dial carrying indicia with which said pointers cooperate, means mounting said pointers for movement across said dial face, a light permeable skirt ring having areas of different colors surrounding said dial, a source of illumination disposed outside said skirt ring, said source adapted to supply light through said skirt ring onto said pointers, said skirt ring being adapted to pass light of one color to one of said pointers and being adapted to pass light of another color to the other of said pointers, a plurality of light louvers and means mounting said light louvers adjacent said dial face to prevent interference between the light passing to the respective pointers.

7. In an instrument illumination system a pair of pointers, a dial carrying indicia with which said pointers cooperate, means mounting said pointers for movement across said dial face, a light permeable skirt ring having areas of different colors surrounding said dial and a source of illumination disposed outside said skirt ring, said source being adapted to supply light through said skirt ring onto said pointers, said skirt ring being adapted to pass light of one color to one of said pointers and being adapted to pass light of another color to the other of said pointers, said pointers having beveled ends for receiving light from a radial direction.

8. In an instrument illumination system a pair of pointers, a dial block, a dial face on said block providing indicia with which said pointers cooperate, means mounting said pointers for movement across said dial face, a light permeable skirt ring having areas of different colors surrounding said dial block and said pointers and a source of illumination disposed outside said skirt ring, said source adapted to supply light through said skirt ring onto said pointers, said skirt ring being adapted to pass light of one color to one of said pointers and being adapted to pass light of another color to the other of said pointers.

9. In a multicolor instrument a pair of pointers, a dial face carrying indicia with which said pointers cooperate, means mounting said pointers for movement about a common axis across said dial face, means for illuminating said pointers with light of different colors in one area of their movement with respect to said dial face, means for illuminating said pointers with light of the same color over other areas of their movement with reference to the dial face and means positioning said illuminating means with relation to said pointers to cause the first named illuminating means to illuminate said pointers with light of different colors in said one area and to cause said second named illuminating means to illuminate said pointers with light of the same color over said other areas.

10. In a multicolor instrument a pointer, a dial face carrying indicia with which said pointer cooperates, means mounting said pointer for movement over said dial face, said pointer being formed with a beveled end providing a light reflecting surface, a light source and means for illuminating the surface of said beveled end of said pointer from said source with light of one color in one area of its movement with reference to its dial face and with light of a different color in another area of its movement with reference to the dial face.

References Cited in the file of this patent

UNITED STATES PATENTS 2,613,630  McNairy _____ Oct. 14, 1952

FOREIGN PATENTS 465,710  Great Britain _____ May 13, 1937
674,238  Great Britain _____ June 18, 1952